(12) United States Patent
LoCascio et al.

(10) Patent No.: US 6,710,911 B2
(45) Date of Patent: Mar. 23, 2004

(54) OPTICAL WAVELENGTH CONVERTER

(75) Inventors: Michael LoCascio, Albany, NY (US); Clinton T. Ballinger, Burnt Hills, NY (US); Daniel P. Landry, Clifton Park, NY (US)

(73) Assignee: Evident Technologies, Troy, NY (US)

( * ) Notice: Subject to any disclaimer, the term of this patent is extended or adjusted under 35 U.S.C. 154(b) by 237 days.

(21) Appl. No.: 09/796,808

(22) Filed: Mar. 2, 2001

(65) Prior Publication Data

US 2002/0122241 A1 Sep. 5, 2002

(51) Int. Cl.[7] .............................. G02F 2/02; G02F 1/365
(52) U.S. Cl. ........................................ 359/326; 359/332
(58) Field of Search ................................. 359/326–332; 385/16

(56) References Cited

U.S. PATENT DOCUMENTS

| | | | | |
|---|---|---|---|---|
| 5,175,741 A | | 12/1992 | Okazaki ....................... 372/75 |
| 5,345,455 A | * | 9/1994 | Gabriagues et al. .......... 372/20 |
| 5,381,429 A | | 1/1995 | Minemoto et al. ............ 372/21 |
| 5,612,805 A | * | 3/1997 | Fevrier et al. ............... 359/124 |
| 5,619,368 A | | 4/1997 | Swanson ..................... 359/326 |
| 5,627,925 A | * | 5/1997 | Alferness et al. ............. 385/17 |
| 5,739,935 A | * | 4/1998 | Sabella ....................... 359/128 |
| 5,892,614 A | * | 4/1999 | Asaba ......................... 359/330 |
| 5,940,207 A | | 8/1999 | Weich et al. ................ 359/333 |
| 5,949,573 A | | 9/1999 | Glance ....................... 359/326 |
| 5,959,764 A | | 9/1999 | Edagawa et al. ............ 359/326 |
| 5,978,129 A | | 11/1999 | Jourdan et al. .............. 359/326 |
| 6,046,841 A | | 4/2000 | Mahgerefteh et al. ....... 359/326 |
| 6,069,732 A | | 5/2000 | Koch et al. .................. 359/344 |
| 6,078,417 A | | 6/2000 | Perino et al. ................ 359/160 |
| 6,101,027 A | | 8/2000 | Lee et al. .................... 359/344 |
| 6,118,117 A | | 9/2000 | Ducellier et al. ........... 250/214 |
| 6,137,604 A | | 10/2000 | Bergano ..................... 359/124 |
| 6,195,188 B1 | * | 2/2001 | Sekiguchi .................... 359/124 |
| 6,274,323 B1 | | 8/2001 | Bruchez et al. ................ 435/6 |
| 6,292,119 B1 | * | 9/2001 | Carillo et al. ............... 341/137 |
| 2002/0196497 A1 | * | 12/2002 | LoCascio et al. .......... 359/135 |

OTHER PUBLICATIONS

Leuthold, Juerg et al., "All–Optical Mach–Zehnder Interferometer Wavelength Converters and Switches with Integrated Data– and Control–Signal Separation Scheme," *Journal of Lightwave Technology*, vol. 17, No. 6, Jun. 1999, pp. 1056–1066.

\* cited by examiner

*Primary Examiner*—John D. Lee
(74) *Attorney, Agent, or Firm*—Kenyon & Kenyon

(57) ABSTRACT

An optical wavelength converter converts an optical input signal having a first wavelength into an optical output signal having a second wavelength. The wavelength converter includes a saturable absorber switch having a control beam waveguide and an input waveguide. The converter further includes a first input coupled to the control beam waveguide and adapted to receive the optical input signal, and a second input coupled to the input waveguide and adapted to receive a second optical signal having the second wavelength from an optical source.

39 Claims, 7 Drawing Sheets

OPTICAL WAVELENGTH CONVERTER

CROSS-REFERENCES TO RELATED APPLICATIONS

This application is related to U.S. patent application Ser. No. 09/737,470, filed Dec. 18, 2000 and entitled "Optical Switch Having A Saturable Absorber".

FIELD OF THE INVENTION

The present invention is directed to optical communications. More particularly, the present invention is directed to an optical wavelength converter.

BACKGROUND INFORMATION

Optical communication systems increasingly utilize Dense Wavelength Division Multiplexing ("DWDM") to increase the available bandwidth in installed optical fiber. DWDM involves the transferring of information in the form of different wavelengths or channels on the same fiber. In a DWDM system, individual bitstreams modulated on each channel can be redirected to other fibers at each node through the use of add/drop filters.

In very small optical networks, particular wavelengths can be dynamically allocated to individual connections, and it is possible to route a signal from end-to-end across the network without having to change wavelengths. However, when such a network is scaled to a reasonably large size, allocation of unique end-to-end wavelengths becomes very difficult to achieve. The network could have many vacant optical channels or wavelengths over all of its links, but a single unique wavelength may not be available on any of the possible paths between two end users. To overcome this problem, it is necessary to change the wavelength of some signals as they traverse the network by using a wavelength converter.

An ideal wavelength converter is a single input/output device that converts the wavelength of a channel appearing on its input port to a different value at its output port, but otherwise leaves the optical signal unchanged. Wavelength converters may be separated into two categories: those based on optical-gated effects, and those that use wavelength mixing, referred to as "coherent converters". Optically gated converters typically operate on a single input signal and are not transparent to bit rate and modulation format, whereas the wavelength mixing converters operate transparently on multiple signals within a broad band of wavelengths. Within this latter category, devices based on four-wave mixing and difference frequency generation (also referred to as "three-wave mixing") are known.

The most commonly used wavelength converter is an opto-electronic wavelength converter which first converts the optical signal into electrical form before converting it to a different wavelength. In an opto-electronic wavelength converter, an intensity modulated signal at wavelength $\lambda_1$ is converted to electrical form in a photodetector, amplified, and used to modulate a laser operating at a different wavelength $\lambda_2$. Although an opto-electronic wavelength converter is good in terms of power output or gain, it is inherently nonlinear, and hence opaque. For example, two superimposed signals at different wavelengths cannot be converted simultaneously. In addition, an opto-electronic wavelength converter, because it requires electronic components, consumes a lot of power, adds significant noise to the signal, and is expensive to design for very high bit rates because of the problem with cross-talk.

Another known optical converter is a device that uses cross-talk in a Semiconductor Optical Amplifier ("SOA"). SOAs have severe cross-talk when operating close to saturation. When a relatively high level signal is fed into an SOA, it saturates. Specifically, the gain medium gives up all, or nearly all, of its excited state electrons and for a short time until more energy is supplied by the pump it cannot amplify any more. If two DWDM signals are fed to an SOA at saturation, the result is very severe cross-talk between them for the above reason.

Optical converter devices make intentional use of this cross-talk by feeding a modulated signal at a relatively high intensity to the SOA. This is mixed with another lower intensity unmodulated signal at a different wavelength, referred to as the "probe". On exit from the SOA, the probe signal will now carry the modulations from the original data signal. However, the modulations are the inverse of the unmodulated signal. The original signal is then filtered out. One problem with this type of wavelength conversion is that a high enough signal level can only be achieved by using a relatively high-level data signal and a low level probe signal. This means that the data signal needs to be preamplified before entering the SOA, and the probe needs to be post-amplified at the output.

Another known method of optical conversion is the use of cross-phase modulation in an SOA. Operating at saturation intensity modulation in one signal stream can affect the refractive index of the active region in an SOA. This changes the phase of all signals passing through it. In optical conversion devices, the changes in phase are converted to changes in amplitude by situating the SOA in one arm of a Mach-Zender interferometer.

Four-wave mixing ("FWM") in an SOA is another known method of optical conversion. In the phenomenon of four-wave mixing, an unmodulated probe signal is mixed with the original signal. FWM utilizes the cross talk incurred by passing a high amplitude optical signal through a material with a large cubic nonlinearity. The wavelength of the probe signal is chosen so that one of the sideband signals produced will have the desired wavelength. Various ways are used to separate the desired signal from the input signal and the probe such as by using a circulator and an in-fiber Bragg grating.

FWM can operate at high bit rates and is modulation format independent. FWM produces two output frequencies, one of which must be filtered out. The probe signal in FWM is close to the wavelength of the input and output signals. One problem with FWM is that the wavelength of the output signal is a function of the wavelength of the input signal, so unwanted variations in the input signal create similar wavelength variations in the output.

Wavelength conversion using Difference Frequency Generation ("DFG") is similar to FWM, except that DFG is a non-linear effect experienced within waveguides at relatively high power levels. DFG provides a very low noise operation and can shift multiple wavelengths at the same time. In addition, it's fast and bi-directional. However, DFG is low in efficiency and very polarization sensitive.

Finally, acoustic filters and modulators have been used to shift the optical frequency by the amount of the acoustic frequency. However, to get any really significant shift in wavelength (e.g., 1 nm), a very high acoustic frequency (e.g., 130 GHz) is required. Such an acoustic frequency is not currently possible, but smaller wavelength shifts of approximately 1 GHz are currently realizable Based on the foregoing, there is a need for an improved wavelength converter for converting the wavelength of optical signals.

SUMMARY OF THE INVENTION

One embodiment of the present invention is an optical wavelength converter that converts an optical input signal having a first wavelength into an optical output signal having a second wavelength. The wavelength converter includes a saturable absorber switch having a control beam waveguide and an input waveguide. The converter further includes a first input coupled to the control beam waveguide and adapted to receive the optical input signal, and a second input coupled to the input waveguide and adapted to receive a second optical signal having the second wavelength from an optical source.

DETAILED DESCRIPTION

One embodiment of the present invention is an optical wavelength converter that includes a saturable absorber. The wavelength converter is all-optical, and does not invert the changed wavelength signal.

Figure 1:
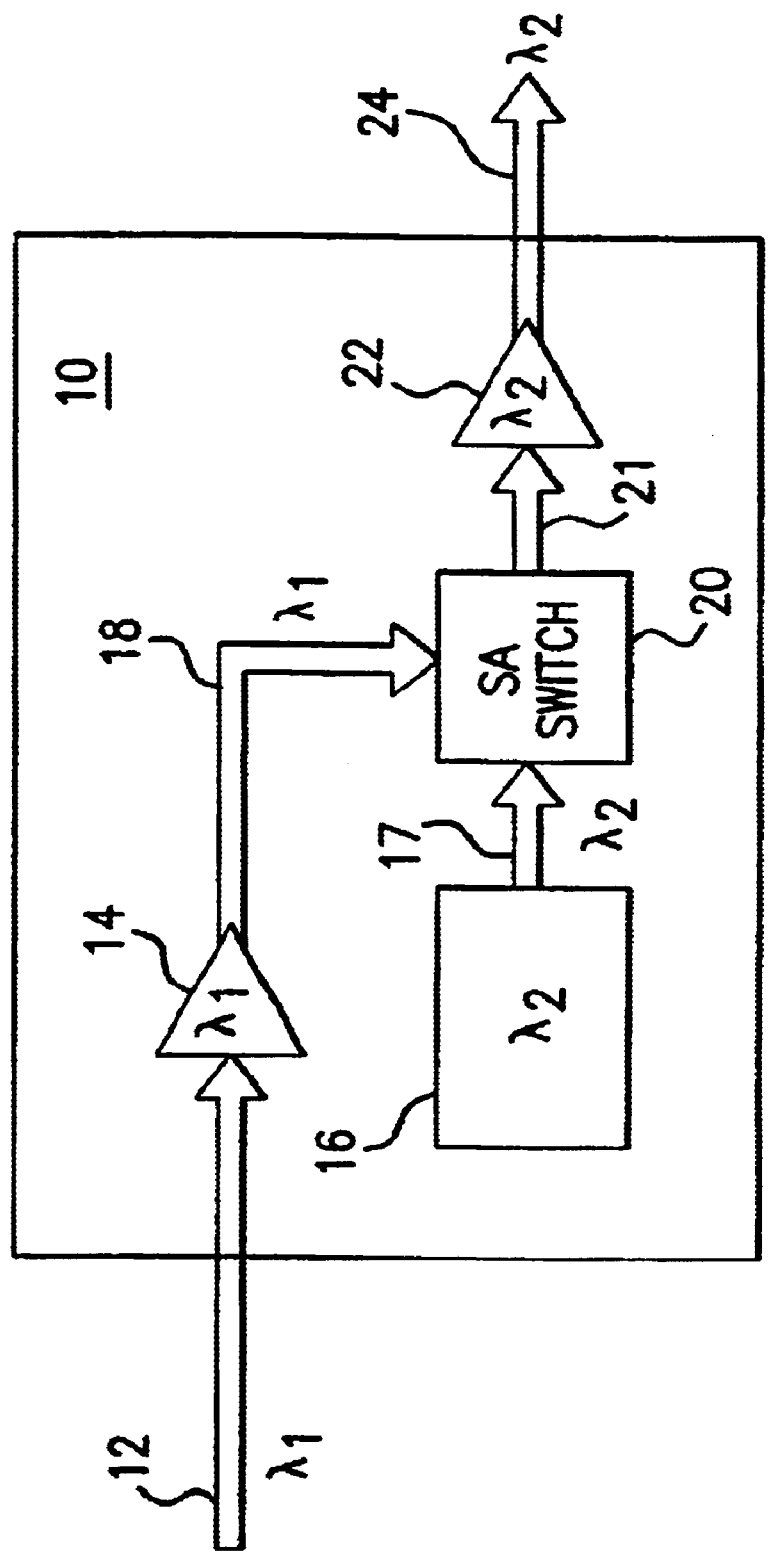
FIG. 1 is a block diagram of an optical wavelength converter in accordance with one embodiment of the present invention.

FIG. 1 is a block diagram of an optical wavelength converter in accordance with one embodiment of the present invention. Optical wavelength converter 10 converts an input signal 12 of wavelength $\lambda_1$ into an output signal 24 of wavelength $\lambda_2$. In one embodiment, input signal 12 and output signal 24 are carried on an optical waveguide such as an optical fiber.

Optical wavelength converter 10 includes a saturable absorber switch 20. Input to saturable absorber switch 20 is a control beam 18 of wavelength $\lambda_1$ and an input beam 17 of wavelength $\lambda_2$. Control beam 18 is identical to input signal 12 in one embodiment. In other embodiments, because control beam 18 is at a high intensity, input signal 12 is first input to a preamplifier 14, which amplifies the signal and outputs it as control beam 18.

In one embodiment, input beam 17 can be supplied via a laser 16 emitting a single wavelength or tunable over a range of wavelengths within the absorption region of saturable absorber switch 20. Laser 16 may be coupled to saturable absorber switch 20 either directly or via an optical waveguide. In another embodiment, input beam 17 may be supplied by a Light Emitting Diode ("LED") or any other optical source.

Saturable absorber switch 20 outputs an output beam 21 of wavelength $\lambda_2$. A post-amplifier 22 amplifies output beam 21 and generates output signal 24. Preamplifier 14 and post-amplifier 22 may be an Erbium Doped Fiber Amplifier ("EDFA"), an SOA, or other known amplifier.

Figure 2:
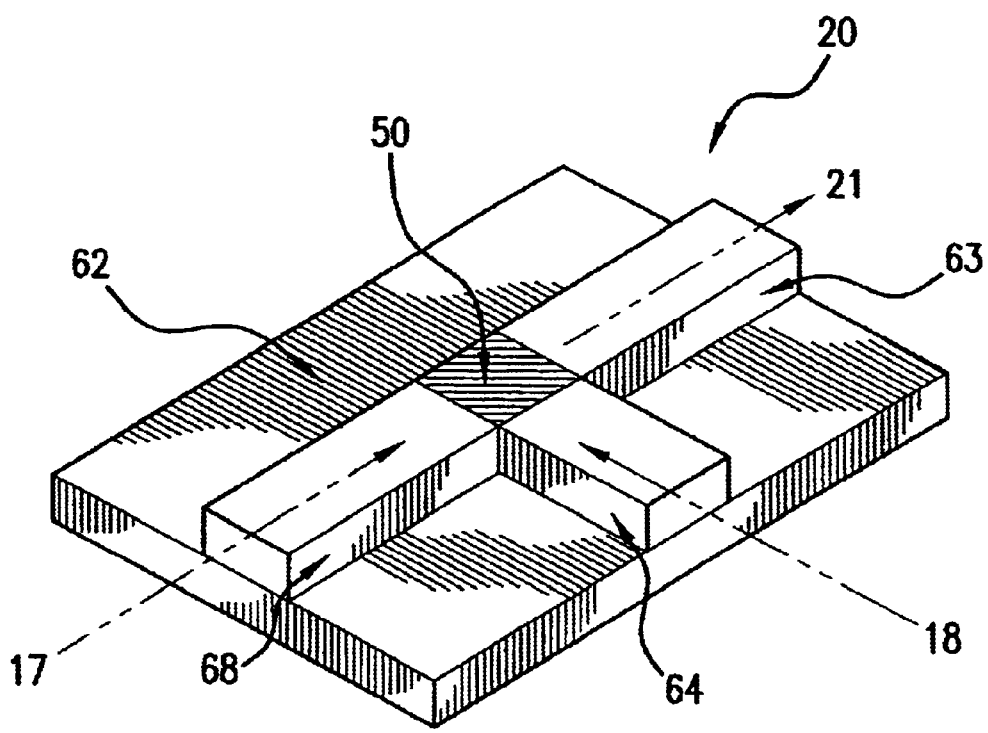
FIG. 2 is a perspective diagram of a saturable absorber switch.

FIG. 2 is a perspective diagram of saturable absorber switch. Switch 20 includes a slab of saturable absorber material ("SA material") 50 formed on a substrate 62. Coupled to SA material 50, and also formed on substrate 62, is an input waveguide 68, a control beam waveguide 64 and an output waveguide 63. Control beam 18 from FIG. 1 is coupled to control beam waveguide 64, input beam 17 is coupled to input waveguide 68, and output beam 21 is coupled to output waveguide 63.

SA material 50 is a non-linear absorbing medium. Under conditions where relatively low intensity light is incident upon SA material 50, it is highly absorbing. However, upon illumination by a high intensity beam, SA material 50 saturates, becoming less absorbing.

An incident optical beam having an associated wavelength within the absorption region of SA material 50 can saturate it (making it less absorbing) over its entire absorption range. Thus, it is possible for a high intensity optical beam (control beam 18) of wavelength $\lambda_1$ to switch another optical beam (input beam 17) having a wavelength $\lambda_2$ given that both wavelengths fall within the absorption band of SA material 50. Wavelength $\lambda_1$ can be either greater or smaller than wavelength $\lambda_2$. Therefore wavelength converter 10 can achieve both "up" conversion and "down" conversion functions, where "up" conversion refers to a conversion from a low energy photon (i.e., long wavelength photon) to a high energy photon (i.e. short wavelength photon) and "down" conversion refers to the opposite.

In general, a saturable absorber such as SA material 50 is a material that displays a reduction in the absorption coefficient at the operational wavelength with increased incident light intensity. The behavior of such a material can be modeled as a two state system, i.e., a system possessing two quantum states of different energies that an electron can exist in. In the natural state of the material, one in which no light is incident upon the material, all electrons lie in the lower energy state. An incident photon having a wavelength (hence energy) that corresponds to the energy difference between the quantum states will be absorbed if it excites an electron from the lower energy level to the upper energy level.

An electron in the upper state will drop back to the lower energy level in one of two ways. It can (1) spontaneously drop back and release energy as heat (referred to as "non-radiative recombination") or as a photon of the same wavelength that originally excited it (referred to as "spontaneous radiative recombination" or "spontaneous emission") or (2) interact with another photon, having the wavelength corresponding to the energy difference between quantum states, that forces the electron down to the lower energy level by the release of two photons (referred to as "spontaneous emission"). The average time the electron remains in the upper level (assuming the drop from the upper state to the lower state is by spontaneous recombination) is given by the relaxation constant ($\tau$).

At low light intensities there is a much higher probability of an electron being excited to an upper energy level than an electron being forced down to the lower energy level because at low light intensities very few electrons exist in the upper state. At higher light intensities a higher fraction of the electrons build up in the upper state. Because more electrons exist in the upper state there is a larger probability of an electron being forced to a lower energy level. At the limit (extremely high light intensities) an equal number of electrons exist in the upper state as in the lower state. At this point there is an equal probability of an electron in the lower energy levels jumping to the upper energy level (absorbing a photon) as an electron in the upper energy level interacting with a photon and dropping to the lower energy level releasing two photons. If both processes are considered there is no net reduction of the number of photons. Hence, the absorption falls to zero.

A saturable absorber such as SA material 50 differs from, for example, a non-linear material. As discussed, a saturable absorber involves the transitions of electrons between quantum states. In contrast, non-linear materials, instead of relying on transitions, involve the non-linear reaction due to the electric field of the photons at high photon fluxes (i.e., high light intensity). This reaction is called the electric polarization (P). Because a saturable absorber requires a transition between states, it is highly selective as to which wavelength it can operate in (i.e., only wavelengths that correspond to an electronic transition can saturate a saturable absorber).

Wavelength converter 10 has a transmissive based architecture in which saturable absorber switch 20 is configured on a normally "off" mode. Saturable absorber switch 20 is highly absorbing to an optical signal beam when there is no control light incident upon the it. However, when it is illuminated by a high intensity control beam the device becomes transparent to the signal optical beam.

Figure 3:
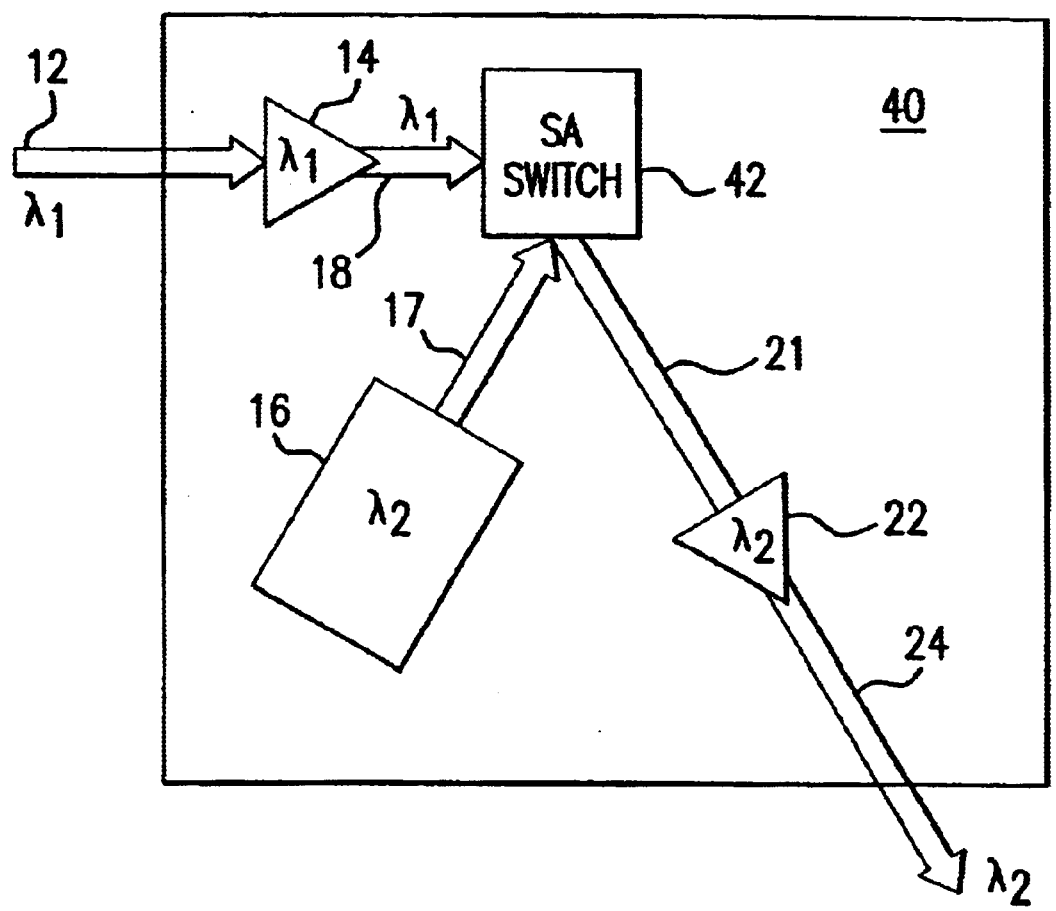
FIG. 3 is a block diagram of an optical wavelength converter in accordance with another embodiment of the present invention.

FIG. 3 is a block diagram of an optical wavelength converter in accordance with another embodiment of the present invention. Wavelength converter 40 has a reflective based architecture. Saturable absorber switch 42 can be configured in a normally "on" or normally "off" state. In the normally "on" state, saturable absorber switch 42 is highly reflective to input beam 17 with no illumination by high intensity control beam 18. When control beam 18 is incident upon saturable absorber switch 42, saturable absorber switch 42 becomes highly absorbing and no signal light is reflected. The opposite is true for the normally "off" reflective based architecture. For this case saturable absorber switch 42 is highly absorbing when there is no control light incident upon it. However, when control beam 18 illuminates it, saturable absorber switch 42 becomes highly reflective to optical input beam 17.

The time required for the wavelength conversion operation to take place in one embodiment of the present invention is dependent upon the relaxation time of the saturable absorber and the intensity of the incident optical control beam. Typical times are in the range of several picoseconds to several tens of picoseconds.

The wavelength converter is noninverting in embodiments of the present invention that employ either a reflective or transmissive based saturable absorber with a normally "off" architecture. Therefore, the output having a wavelength $\lambda_2$ is identical to that of the input having a wavelength $\lambda_1$ (i.e., when the input signal is "on" corresponding to a digital "1", the output is also "on" and vice versa). However, when a reflective based switch with the normally "on" architecture is employed, the wavelength converter is inverting (i.e., when the input signal is "on" the output is "off" and vice versa).

In one embodiment of the present invention, saturable absorber switches 20 and 42 includes a Fabry-Perot resonator in which a resonator cavity is formed by placing the saturable absorber material within a mirrored cavity. The dimensions of the cavity are such that it is resonant with the operational wavelength (i.e., 1500 nm). The cavity-based switch can be used in a transparent mode in which the optical transmission is altered from a low value (between 0.08% and 0.09%) in the "off" state to a higher value (between 80% and 90%) in the "on" state. The switch can also be configured in a reflective mode in which the reflectivity of the device is at a low value in the "off" state (between 0.08% and 0.09% reflective) and is a high value in the "on" state (between 80% and 90% reflective). These values are chosen because of standard requirements that the insertion loss (i.e., the power loss of the inputted data signal in the "on" state) be less than 1 dB (greater than approximately 80%). In addition, the isolation (i.e., the difference between the "on" and "off" states) should be at least 20 dB (the "on" state has 100 time the output power than the "off" state).

The use of the Fabry-Perot cavity device architecture greatly enhances the non-linear absorption effects of the saturable absorber material. In effect, less of a change in the absorption coefficient is required for the same levels of the "on" and "off" states. Control over the performance characteristics of the device are governed by the reflectivity of both the front and rear mirrors as well as the absorption of the saturable absorbing material in the "off" state (i.e., when there is no control light incident upon the material).

The devices can be configured in either a normally "off" mode, in which the device either transmits or reflects the signal optical pulse only when the control optical pulse is incident upon the device, or in the normally "on" mode, in which the optical signal pulse is transmitted or reflected only when there is no control optical signal incident upon the device. The latter configuration performs the logical invert function.

In the Fabry-Perot embodiments, the saturable absorber material, where absorption occurs, is placed between two parallel mirror structures forming the Fabry-Perot cavity for the data containing optical signal. Another microcavity may be formed for the control optical pulses to enhance the absorption of the control beam.

The normally "off" reflective based Fabry-Perot device operates by absorbing the optical data pulse when there is no control optical signal simultaneously incident upon the active region (the "off" state). When there is a control beam simultaneously incident upon the active region (the "on" state) the absorption coefficient of the active material is greatly reduced and the data signal is reflected off the front surface of the device into the output.

The normally "on" reflective based Fabry-Perot device reflects the optical signal beam off the front mirror when there is no control beam simultaneously incident upon the active region and absorbs the optical data signal beam when there is an optical control beam incident upon the active region. The device is nearly identical to that of the normally "off" device with the exception of the absorption coefficient of the saturable absorber material relative to the minimum reflected power is opposite that of the "normally off" device. For example, the low field absorption (i.e., no control beam incident upon the active region) of the saturable absorber material for a front mirror reflectivity of 0.95 is 10000 cm$^{-1}$ corresponding to a reflectivity of 0.9. When the control beam is incident upon the active region the absorption coefficient is lowered and the reflectivity is subsequently reduced. If the absorption coefficient is reduced to approximately 200 cm$^{-1}$ the reflectivity is reduced to approximately 0.009.

The normally "off" transmission based Fabry-Perot device operates by altering the transparency of the cavity using a change in the absorption coefficient of the saturable absorber material within the cavity. When a high intensity control beam is incident upon the saturable absorbing material the absorption coefficient is decreased. The decreased absorption coefficient has the effect of making the Fabry-Perot device more transparent.

One embodiment of SA material 50 is a composite material containing semiconductor nanocrystals (referred to as "quantum dots") contained in a glass or silicon matrix. The size, particle composition and coating of the quantum dots are such that there is high absorption in the desired wavelength region of the saturable absorber. In general, the absorption peak caused by the quantum dots is broadened over a range of wavelengths due to a distribution in the size of the quantum dots, thermal fluctuations, and broadening due to the uncertainty in the relaxation time.

Quantum dots interspersed within a matrix material offer an opportunity for an ideal saturable absorber for multiple reasons. For one, the quantum states of the quantum dots can be engineered to correspond to any wavelength simply by altering their size. Further, the density of quantum states (i.e., the number of electrons per unit volume that are able to jump from one quantum state to another) are much lower than in bulk semiconductor materials. Therefore, a lower intensity incident light beam is required for it to saturate. Further, quantum dots eliminate slower excitations that occur at high light intensities such as a two photon absorption that exists in bulk semiconductors. Therefore, the use of quantum dots enables a fast, low power (low intensity), and tunable saturable absorber.

In one embodiment, the quantum dots are comprised of Lead Sulfide, Lead Selenide, Indium Phosphide, Indium Arsenide, etc., and are approximately 6 nanometers in diameter. This size of the dots results in a large change of absorption intensity while maintaining fast switching speed. The intensity of light required to saturate the saturable absorber depends on the size and composition of the dots, as characterized by the optical cross section of the saturable absorber. The concentration of dots determines how thick a slab of material (quantum dots in glass) is required to produce a given change in intensity of the signal. In one embodiment, a thickness of 0.1 cm is required to arrive at a 20 dB signal change (assuming 50% saturation). Increasing the dot density allows the same change with a thinner device. The absorption length ($\alpha_0^{-1}$) is related to the optical cross section ($\sigma_0$) and the number density (dots per volume) of dots $N_d$ by:

$$\alpha_0 = N_d \sigma_0 \qquad \text{Eq. 1}$$

A limitation exists to the concentration of dots within the matrix material because it is not possible to pack dots any closer than when they are touching. The densest packing configuration is the face-centered cubic ("FCC") lattice which has a packing density of 0.7.

In one embodiment, the quantum dots are produced in a glass matrix. The glass matrix material is beneficial because it is transparent to the light which is to be absorbed by the dots, and it acts to confine the electron-hole pairs because it has a much larger band gap than the quantum dot material. This quantum confinement allows the requisite absorption spectrum to be obtained. In other embodiments, the matrix material is a plastic, or a semiconductor that is transparent to the operational wavelengths. Other possible matrix materials include Silicate, Borosilicate, and Phosphosilicate glasses, Polymethyl methacrylate (PMMA), Acrylic, polyamine polymers, and semiconductors including Silicon, Silicon Carbide, Cadmium Sulphide, Cadmium Selenide, Cadmium Telluride, Zinc Sulphide, Aluminum Arsenide, Aluminum Phosphide and Gallium Arsenide.

In one embodiment, cladding is added to the quantum dots. The purpose of the cladding is to greatly increase the optical cross-section of the core semiconductor quantum dot, thus decreasing the optical power required for saturation as well as decreasing the relaxation time. An electrically conducting cladding material (like a metal) locally increases the light intensity within the core semiconductor, thus enhancing the absorption cross section. A semiconductor cladding material acts as a surface passivating agent and reduces the number of trapped states, which increases the absorption cross section.

The band-gap energy of the cladding material is wider than the band-gap of the core semiconductor. In one embodiment, wavelength converter 20 of FIG. 1 has an operational wavelength of 1500 nm (0.827 eV). In this embodiment, suitable semiconductor cladding materials include Silicon (Si), Silicon Carbide (SiC), Cadmium Sulfide (CdS), Cadmium Selenide (CdSe), Zinc Sulfide (ZnS), Zinc Selenide (ZnSe), Zinc Telluride (ZnTe), AlAs, AlP, AlSb, GaAs and InP. In addition, other materials that include metals such as Ag, Au and Al are appropriate for use as cladding materials.

The thickness of the cladding coating determines the enhancement of the absorption coefficient of the quantum dot material. The parameter describing the coating thickness is the ratio of the core radius to the shell radius ("arat"). Typical values of arat are between 0.7 and 0.85. Thus for core radii between 2.5 nm and 5.0 nm (appropriate for PbS), a shell thickness between 0.5 nm and 2.5 nm gives the desired enhancement.

In one embodiment, the quantum dots are manufactured using a thermal precipitation process that involves dissolving some amount of semiconductor material in a molten glass. The melt is controllably cooled until the quantum dots begin to precipitate out in the form of nano-crystals. A method for manufacturing quantum dots using a thermal precipitation process is disclosed in, for example, P. T. Guerreiro et al., "PbS Quantum-Dot Doped Glasses as Saturable Absorbers for Mode Locking of a Cr:Forsterite Laser", Appl. Phys. Lett. 71 (12), Sep. 22, 1997 at 1595.

In another embodiment, SA material 50 of FIG. 2 is manufactured using a colloidal growth process that involves growing nano-crystal quantum dots in a solution. Specifically, semiconductor precursors are introduced into a heated surfactant solution. The precursors crack in the solution and the semiconductors combine to form the nanocrystals. The quantum dots can then be removed from the solution and combined with a powdered glass solution. The powdered glass, referred to as a "sol-gel" can be shaped into a variety of forms. The sol-gel can be sintered into a large block, drawn and sintered into a fiber, or spun on a substrate and sintered to form a thin film. A method for manufacturing quantum dots using a colloidal growth process is disclosed in, for example: (1) U.S. Pat. No. 5,505,928, entitled "Preparation of III–V Semiconductor Nanocrystals"; (2) Nozik et al., "Colloidal Quantum Dots of III–V Semiconductors", MRS Bulletin, February 1998 at 24; and (3) Hao et al., "Synthesis and Optical Properties of CdSe and CdSe/CdS Nanoparticles", Chem. Mater. 1999, 11 at 3096.

Saturable absorber switch 20 and saturable absorber switch 42 may be optical switches that are disclosed in related U.S. patent application Ser. No. 09/737,470, filed Dec. 18, 2000 and entitled "Optical Switch Having A Saturable Absorber" ("Optical Switch patent"), the disclosure of which is herein incorporated by reference.

Wavelength converters 10 or 40 can be fabricated using thin film development processes or be comprised of bulk type components. In one embodiment, saturable absorber switches 20 and 42, including the waveguides and SA material, are integrated onto a single substrate. In other embodiments, preamplifier 14 and post-amplifier 22 are SOAs and are also integrated onto the same substrate. In addition, in another embodiment, laser 16 or other secondary light source having a wavelength of $\lambda_2$ is also integrated onto the same substrate.

Figure 4:
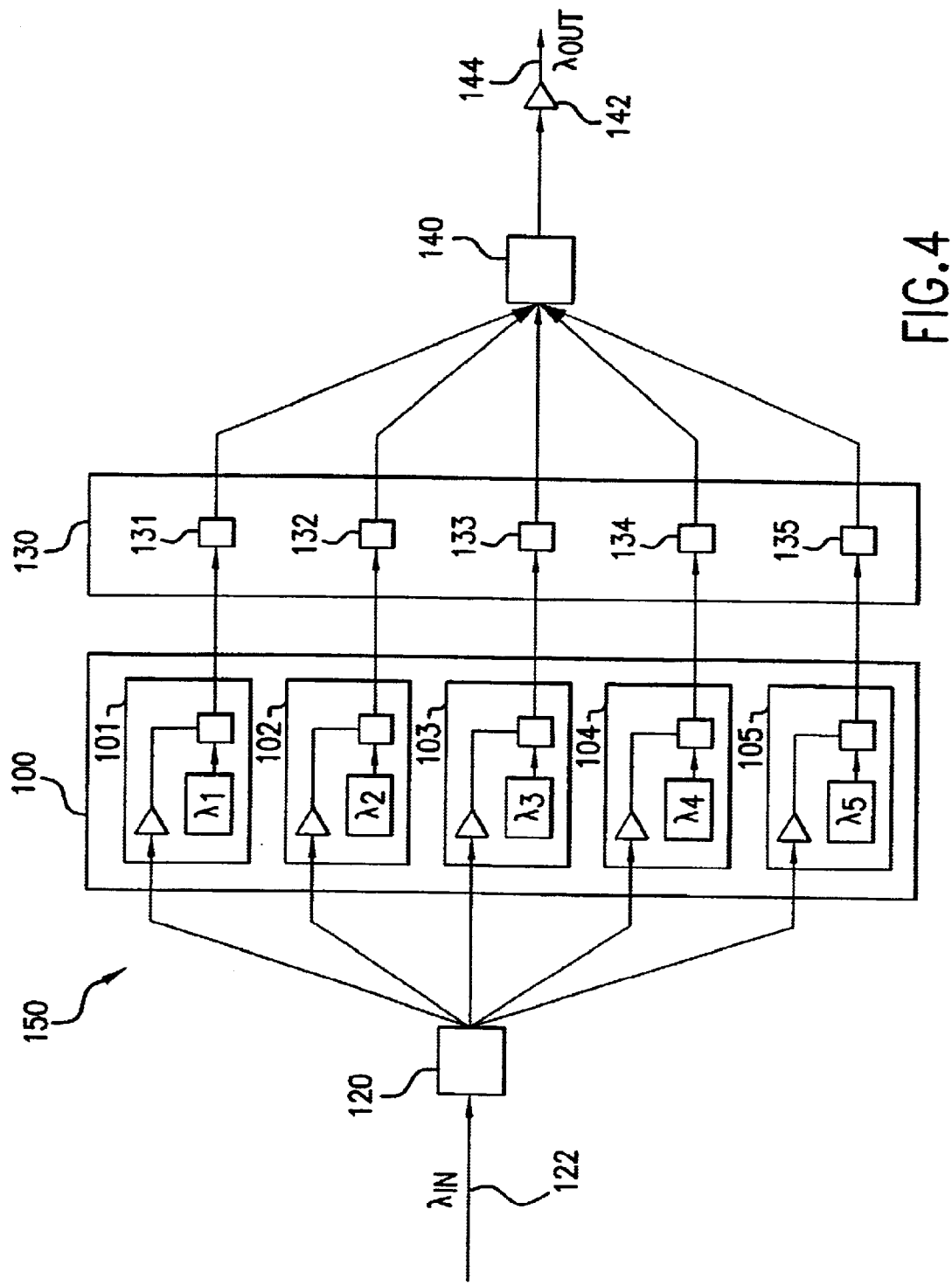
FIG. 4 is a block diagram of one embodiment of a tunable wavelength converter.

The above-described wavelength converter is a relatively simple device that translates one input wavelength to another wavelength. There is also a need for a tunable wavelength converter device that allows the output wavelength to be chosen. FIG. 4 is a block diagram of one embodiment of a tunable wavelength converter. Tunable wavelength converter 150 includes a wavelength converter bank 100. Wavelength converter bank 100 includes a bank of wavelength converters 101–105 in parallel. Each of the wavelength converters corresponds to a different output wavelength channel. In one embodiment, wavelength converters 101–105 have the same structure as wavelength converter 10 of FIG. 1. An optical splitter 120 precedes wavelength converter bank 100. Following wavelength converter bank 100 is a bank of all-optical on/off switches 131–135, followed by an optical combiner 140, which is the opposite of optical splitter 120. Switches 131–135 can be any type of on/off switches, and include a control signal input (not shown) that control whether they are on or off.

In operation, any one input wavelength 122 can be converted to any one output wavelength 144, although wavelength converter 150 remains as a single input/single output device.

In another embodiment, a tunable wavelength converter is created by utilizing a tunable light emitter as the source for the output light. The tunable emitter can be adjusted in real time by, for instance, altering the length of the resonant gain cavity. Although tunable emitters are more costly, utilizing one would greatly simplify the overall tunable wavelength converter device.

In another embodiment, banks of parallel tunable (or static) wavelength converters can be used to combine N fibers all having the same wavelength into one fiber containing a range of wavelength channels (i.e., in a DWDM format). Thus, the device can be used to convert from a single channel system into a DWDM system. Conversely, a parallel bank of wavelength converters can be used to convert multiple wavelengths on a single fiber into N fibers all of the same wavelength.

Figure 5:
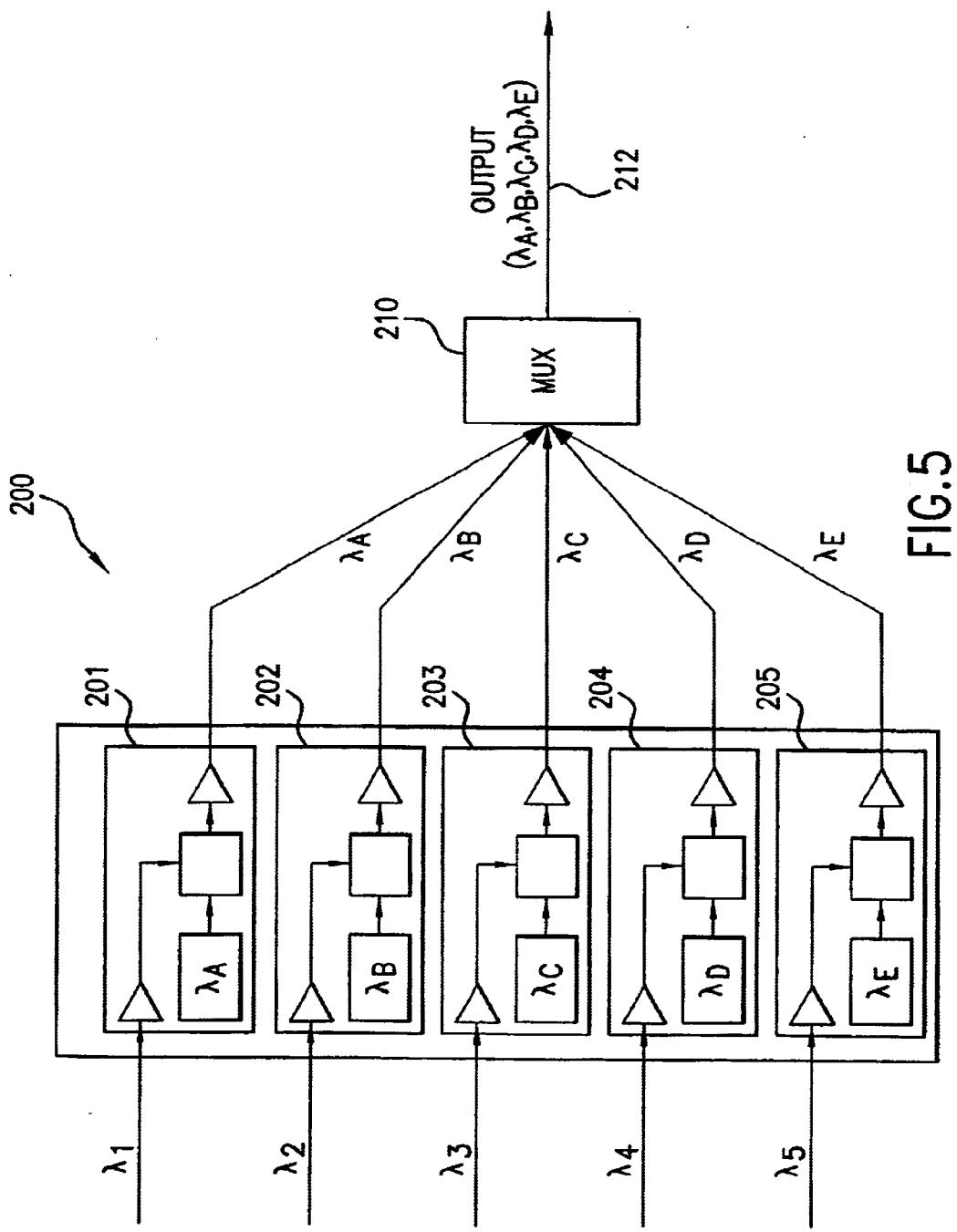
FIG. 5 is a block diagram of one embodiment of a multiplexed system that uses optical wavelength converters.

FIG. 5 is a block diagram of one embodiment of a multiplexed system that uses optical wavelength converters. System 200 includes a bank of wavelength converters (tunable or static) 201–205, where one wavelength converter corresponds to one input fiber and an optical combiner 210 which outputs the multiplexed wavelengths on output 212. In one embodiment, wavelength converters 201–205 have the same structure as wavelength converter 10 of FIG. 1. Each of the wavelength converters within the bank is set to a different wavelength channel.

Figure 6:
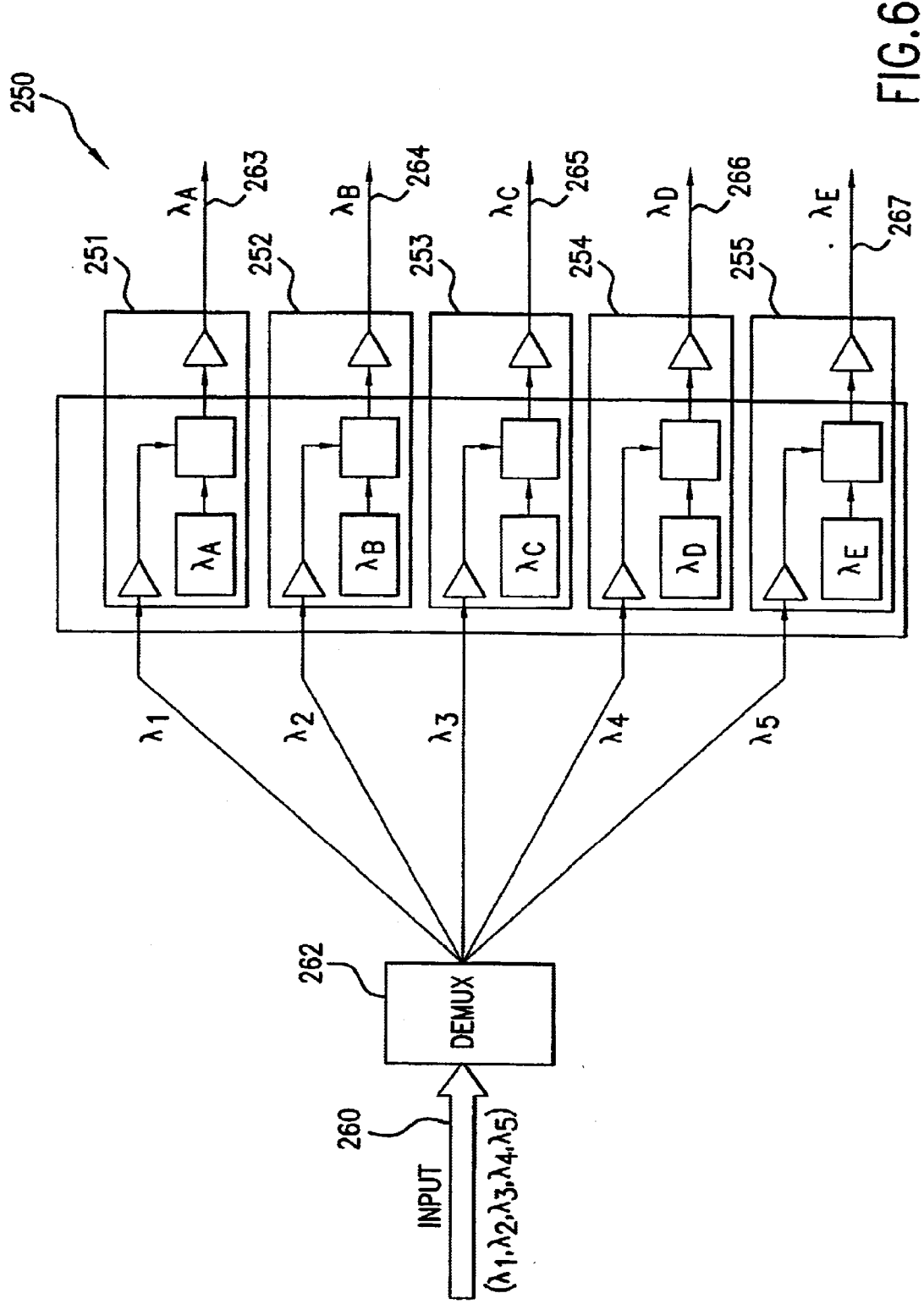
FIG. 6 is a block diagram of one embodiment of a demultiplexer system that uses optical wavelength converters.

FIG. 6 is a block diagram of one embodiment of a demultiplexer system that uses optical wavelength converters. In system 250, a single fiber 260 carrying N multiple wavelengths is divided into N waveguides via a DWDM demultiplexer 262 (usually consisting of an array of filters of one form or another). Following demultiplexer 262 is a bank of wavelength converters 251–255 (tunable or static) each of which corresponds to one of the N split waveguides and set to one output wavelength. In one embodiment, wavelength converters 251–255 have the same structure as wavelength converter 10 of FIG. 1. Coupled to each of the wavelength converters is an output fiber 263–267.

Similarly, if tunable wavelength converter devices are used (whereby the output wavelength channel can be chosen) it is possible to convert any of the input wavelength from any of the input fibers to any wavelength channel and direct the resultant optical signals to any output fiber. Thus, using tunable lasers it is possible to relax the restriction that N input fibers having M wavelength channels be switched into M output fibers having N wavelengths and instead complete both the wavelength translation and spatial translation into any number of output fibers. Of course, the substitution of tunable lasers for static lasers adds cost to the overall system but improves flexibility.

Figure 7:
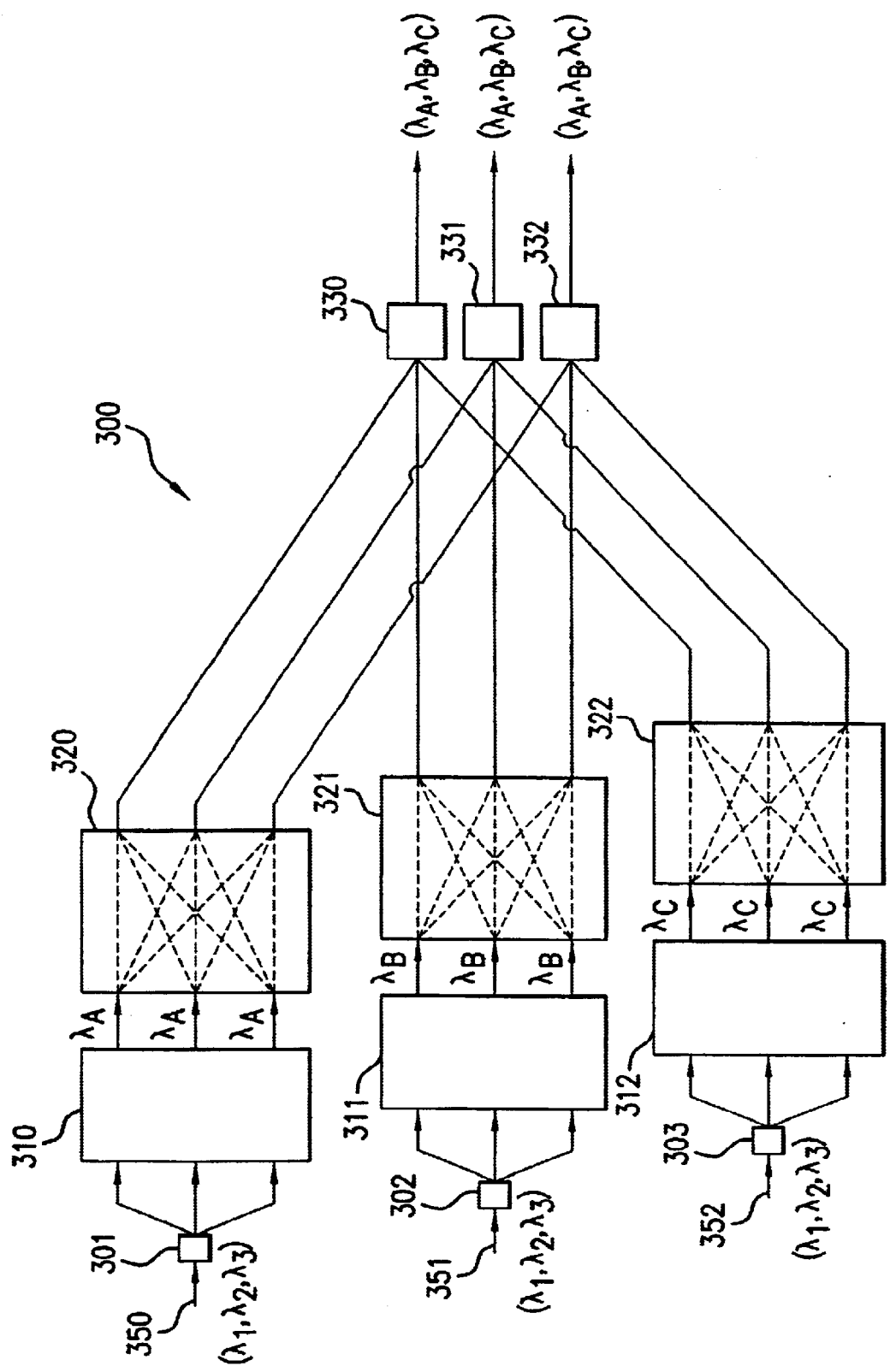
FIG. 7 is a block diagram of one embodiment of a wavelength/spatial switch that uses optical wavelength converters to switch N fibers having M wavelength channels into M fibers with N channels.

FIG. 7 is a block diagram of one embodiment of a wavelength/spatial switch that uses optical wavelength converters to switch N fibers having M wavelength channels into M fibers with N channels. In switch 300 (in which "M" and "N" equal 3), each of the N input fibers 350–352 carrying M wavelength channels is initially coupled to a wavelength demultiplexer device 301–303 that divides each wavelength channel into a different waveguide. In one embodiment, wavelength demultiplexers 301–303 are an array of filters of one form or another. Each of the waveguides carrying optical signals on a different wavelength channel is coupled to a wavelength converter device 310–312 (static or tunable). In one embodiment, wavelength converter devices 310–312 have the same structure as wavelength converter 10 of FIG. 1. At the wavelength converter device all optical signals originating from the same fiber are converted to the same wavelength channel. Therefore, all DWDM signals from fiber 350 are converted to wavelength $\lambda_A$, all DWDM signals from fiber 351 are converted to wavelength $\lambda_B$, and so on.

Following each bank of wavelength converters 310–312 is an M×M cross connect switch 320–322. Cross connect switches 320–322 enable the optical signals originating from any of the M inputs to be switched to any of the M outputs. Cross connect switches 320–322 may be any type of cross connect technology, including micro-electro-mechanical switches ("MEMs"), bubble jet, thermo-optic, electro-optic, and all-optical switches.

Following each of the cross connect switches 320–322 are M optical combiner devices 330–332 that combine the corresponding output from each bank of M×M switches 320–322 into the same output fiber. The first output from each cross connect switch is coupled to the first output fiber, the second output from each cross connect are coupled together to the second output fiber, and so on.

As described, the saturable absorber based optical wavelength converter in accordance with the present invention is non-inverting, provides an increased data rate capability compared to known systems, and it allows for a flexible and scalable system that can handle future system alterations such as increased data rate through each channel without being replaced. Multiple wavelength converters can be combined to form DWDM multiplexers, demultiplexers, and large switching systems.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An optical wavelength converter for converting an optical input signal having a first wavelength into an optical output signal having a second wavelength, said converter comprising:
   a saturable absorber switch having a control beam waveguide and an input waveguide;
   a first input coupled to said control beam waveguide and adapted to receive the optical input signal; and
   a second input coupled to said input waveguide and adapted to receive a second optical signal having said second wavelength from an optical source.

2. The optical wavelength converter of claim 1, further comprising:
   said optical source coupled to said second input.

3. The optical wavelength converter of claim 1, further comprising:
   a preamplifier coupled to said first input.

4. The optical wavelength converter of claim 1, wherein said saturable absorber switch has an output waveguide, said converter further comprising:
   an output coupled to said output waveguide and adapted to transmit said optical output signal.

5. The optical wavelength converter of claim 4, further comprising:
   a post-amplifier coupled to said output.

6. The optical wavelength converter of claim 1, wherein said saturable absorber switch comprises:
   an output waveguide, and
   a saturable absorber coupled to said input waveguide, said control beam waveguide, and said output waveguide.

7. The optical wavelength converter of claim 6, wherein said saturable absorber comprises a plurality of electrons having a first and a second state, and wherein said electrons are in said first state when substantially no light is input to said control beam waveguide, and a portion of said electrons are in said second state when light is input to said control beam waveguide.

8. The optical wavelength converter of claim 7, wherein said first state is a lower energy state, and said second state is an upper energy state.

9. The optical wavelength converter of claim 6, wherein said saturable absorber comprises quantum dots.

10. The optical wavelength converter of claim 9, wherein said quantum dots comprise Lead Sulfide.

11. The optical wavelength converter of claim 9, wherein said saturable absorber comprises cladding coupled to said quantum dots.

12. The optical wavelength converter of claim 11, wherein said quantum dots are manufactured using a colloidal growth process.

13. The optical wavelength converter of claim 6, further comprising a substrate coupled to said input waveguide, said output waveguide, and said control beam waveguide.

14. The optical wavelength converter of claim 1, wherein said optical source is a laser.

15. The optical wavelength converter of claim 1, wherein said converter has a transmissive based architecture.

16. The optical wavelength converter of claim 1, wherein said converter has a reflective based architecture.

17. A method of wavelength converting a first input signal having a first wavelength to an output signal having a second wavelength, said method comprising:
   transmitting said first input signal on a control beam waveguide of a saturable absorber switch;
   transmitting a second input signal having a second wavelength on an input waveguide of the saturable absorber switch; and
   transmitting the output signal on an output waveguide of the saturable absorber switch.

18. The method of claim 17, further comprising:
   generating said second input signal.

19. The method of claim 17, further comprising:
   amplifying said first input signal.

20. The method of claim 17, wherein said first input signal has a first state and a second state, further comprising:
   absorbing the second input signal when said first input signal has the first state; and
   transmitting the second input signal as said output signal when said first input signal has the second state.

21. The method of claim 20, wherein in said first state said first input signal is substantially off, and wherein in said second state said first input signal is on.

22. The method of claim 20, wherein said saturable absorber switch comprises a saturable absorber, wherein said saturable absorber comprises a plurality of electrons, and wherein said plurality of electrons are in a lower energy state when said first input signal has said first state, and a portion of said plurality of electrons are in a higher energy state.

23. The method of claim 22, wherein the saturable absorber comprises quantum dots.

24. The method of claim 23, wherein said saturable absorber comprises cladding coupled to said quantum dots.

25. The method of claim 17, wherein said first input signal has a first state and a second state, further comprising:
   absorbing the second input signal when said first input signal has the first state; and
   reflecting the second input signal as said output signal when said first input signal has the second state.

26. An optical wavelength converter comprising:
   a saturable absorber switch;
   a preamplifier coupled to said saturable absorber switch;
   an input signal waveguide coupled to said preamplifier;
   an optical source coupled to said saturable absorber switch;
   a post-amplifier coupled to said saturable absorber switch; and
   an output signal waveguide coupled to said post-amplifier.

27. The optical wavelength converter of claim 26, wherein said preamplifier has a first wavelength, and said optical source has a second wavelength.

28. The optical wavelength converter of claim 26, wherein said optical source is a laser.

29. The optical wavelength converter of claim 26, wherein said saturable absorber switch comprises a saturable absorber having a control beam waveguide.

30. The optical wavelength converter of claim 29, wherein said saturable absorber comprises a plurality of electrons having a first and a second state, and wherein said electrons are in said first state when substantially no light is input to said control beam waveguide, and a portion of said electrons are in said second state when light is input to said control beam waveguide.

31. The optical wavelength converter of claim 30, wherein said first state is a lower energy state, and said second state is an upper energy state.

32. The optical wavelength converter of claim 29, wherein said saturable absorber comprises quantum dots.

33. The optical wavelength converter of claim 32, wherein said quantum dots comprise Lead Sulfide.

34. The optical wavelength converter of claim 26, wherein said saturable absorber switch is transmissive based.

35. The optical wavelength converter of claim 26, wherein said saturable absorber switch is reflective based.

36. A tunable optical wavelength converter comprising:
   an optical splitter,
   a plurality of optical wavelength converters coupled to said optical splitter;
   a plurality of optical switches coupled to said plurality of optical wavelength converters;
   an optical combiner coupled to said plurality of optical switches;
   wherein each of said plurality of optical wavelength converts comprises:
      a saturable absorber switch having a control beam waveguide and an input waveguide;
      a first input coupled to said control beam waveguide and adapted to receive an optical input signal having a first wavelength; and
      a second input coupled to said input waveguide and adapted to receive a second optical signal having a second wavelength from an optical source.

37. An optical multiplexer system comprising:
   a plurality of optical wavelength converters;
   an optical combiner coupled to said plurality of optical wavelength converters;
   wherein each of said plurality of optical wavelength converts comprises:
      a saturable absorber switch having a control beam waveguide and an input waveguide;
      a first input coupled to said control beam waveguide and adapted to receive an optical input signal having a first wavelength; and
      a second input coupled to said input waveguide and adapted to receive a second optical signal having a second wavelength from an optical source.

38. An optical demultiplexer system comprising:
   an optical demultiplexer;
   a plurality of optical wavelength converters coupled to said optical demultiplexer;
   wherein each of said plurality of optical wavelength converts comprises:
      a saturable absorber switch having a control beam waveguide and an input waveguide;
      a first input coupled to said control beam waveguide and adapted to receive an optical input signal having a first wavelength; and
      a second input coupled to said input waveguide and adapted to receive a second optical signal having a second wavelength from an optical source.

39. An optical wavelength switch comprising:
   a plurality of wavelength demultiplexers;
   a plurality of optical wavelength converters coupled to said plurality of wavelength demultiplexers;
   a plurality of cross connect switches coupled to said plurality of optical wavelength converters;
   a plurality of optical combiners coupled to said plurality of cross connect switches;
   wherein each of said plurality of optical wavelength converts comprises:
      a saturable absorber switch having a control beam waveguide and an input waveguide;
      a first input coupled to said control beam waveguide and adapted to receive an optical input signal having a first wavelength; and
      a second input coupled to said input waveguide and adapted to receive a second optical signal having a second wavelength from an optical source.

* * * * *